United States Patent
Chen et al.

(10) Patent No.: US 8,948,111 B2
(45) Date of Patent: Feb. 3, 2015

(54) UPLINK RESOURCE MANAGEMENT UNDER COORDINATED MULTIPOINT TRANSMISSION

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 13/632,563

(22) Filed: Oct. 1, 2012

(65) Prior Publication Data
US 2013/0083754 A1    Apr. 4, 2013

Related U.S. Application Data

(60) Provisional application No. 61/542,442, filed on Oct. 3, 2011.

(51) Int. Cl.
*H04W 4/00*    (2009.01)
(52) U.S. Cl.
USPC ........................................................ 370/329
(58) Field of Classification Search
CPC ..... H04W 80/04; H04W 88/06; H04W 28/04; H04W 72/04
USPC ................................................. 370/328, 329
See application file for complete search history.

(56) References Cited

U.S. PATENT DOCUMENTS

| | | | |
|---|---|---|---|
| 8,102,862 B2 | 1/2012 | Lee et al. | |
| 2009/0207793 A1* | 8/2009 | Shen et al. | .................. 370/329 |
| 2009/0274100 A1 | 11/2009 | Montojo et al. | |
| 2010/0142467 A1 | 6/2010 | Tiirola et al. | |
| 2011/0075611 A1 | 3/2011 | Choi | |
| 2012/0051319 A1 | 3/2012 | Kwon et al. | |
| 2012/0082157 A1 | 4/2012 | Yamada et al. | |

FOREIGN PATENT DOCUMENTS

| | | | | |
|---|---|---|---|---|
| EP | 2187667 A1 | | 5/2010 | |
| KR | WO 2011052949 | * | 5/2011 | ................ H04J 7/26 |
| WO | WO 2010018226 A2 | | 2/2010 | |

(Continued)

OTHER PUBLICATIONS

International Search Report and Written Opinion—PCT/US2012/058490—ISA/EPO—Dec. 11, 2012.

(Continued)

*Primary Examiner* — Ronald Abelson
(74) *Attorney, Agent, or Firm* — Fulbright & Jaworski LLP

(57) ABSTRACT

Management and distribution of PUCCH resources between first and second eNBs in a CoMP system is disclosed, in which the control and data transmission for a given UE is decoupled. The decoupling of the control and data transmissions allows the first eNB to transmit control information while the second eNB or remote radio head (RRH) transmits data. In such systems, the first eNB communicates a dynamic PUCCH parameter to UEs served in a decoupled manner. The dynamic PUCCH parameter allows the UE to determine uplink communications for the dynamic PUCCH region transmitted to the second eNB in such a position that will not overlap or cause interference with the dynamic PUCCH regions reserved by the first eNB.

100 Claims, 11 Drawing Sheets

(56) References Cited

FOREIGN PATENT DOCUMENTS

WO WO 2010151424 A2 12/2010
WO WO 2011056726 A1 5/2011

OTHER PUBLICATIONS

Nokia Siemens Networks et al: "On the PUCCH Modifications for CoMP", 3GPP Draft; R1-112387, 3rd Generation Partnership Project (3GPP), Mobile Competence Centre; 659, Route Des Lucioles; F-06921 Sophia-Antipolis Cedex ; France, vol. RAN WGI, no. Athens, Greece; 20110822, Aug. 16, 2011, XP050537509, [retrieved on Aug. 16, 2011] the whole document.

Panasonic: "Comparison of Orthogonal/Non-orthogonal CoMP transmission for PUUCH", 3GPP Draft; R1-093460, 3rd Generation Partnership Project (3GPP), Mobile Competence Centre; 650, Route Des Lucioles ; F-06921 Sophia-Antipolis Cedex ; France, no. Shenzhen, China; 20090818, Aug. 18, 2009, XP050351730, [retrieved on Aug. 18, 2009].

Qualcomm Incorporated: "Uplink control signaling for CoMP", 3GPP Draft; R1-113392 Uplink Control Signaling for Comp, 3rd Generation Partnership Project (3GPP), Mobile Competence Centre; 650, Route Des Lucioles; F-06921 Sophia-Antipolis Cedex; France, vol. RAN WGI, no. Zhuhai; 20111010, Oct. 4, 2011, XP050538448, [retrieved on Oct. 4, 2011] the whole document.

Qualcomm Incorporated: "Uplink control signaling for CoMP", 3GPP Draft; R1-121568 UL Control Signaling for Comp, 3rd Generation Partnership Project (3GPP), Mobile Competence Centre ; 650, Route Des Lucioles; F06921 Sophia-Antipolis Cedex; France, vol. RAN WGI, no. Jeju, Korea; 20120326 -20120330, Mar. 20, 2012, XP050599837, [retrieved on Mar. 20, 2012] the whole document.

Qualcomm Incorporated: "Uplink reference sigals for CoMP", 3GPP Draft; R1-113390 UL Reference Signals for Comp, 3rd Generation Partnership Project (3GPP), Mobile Competence Centre; 650, Route Des Lucioles ; F-06921 Sophia-Antipolis Cedex; France, vol. RAN WG1, no. Zhuhai; 20111010, Oct. 4, 2011, XP050538446, [retrieved on Oct. 4, 2011) the whole document.

* cited by examiner

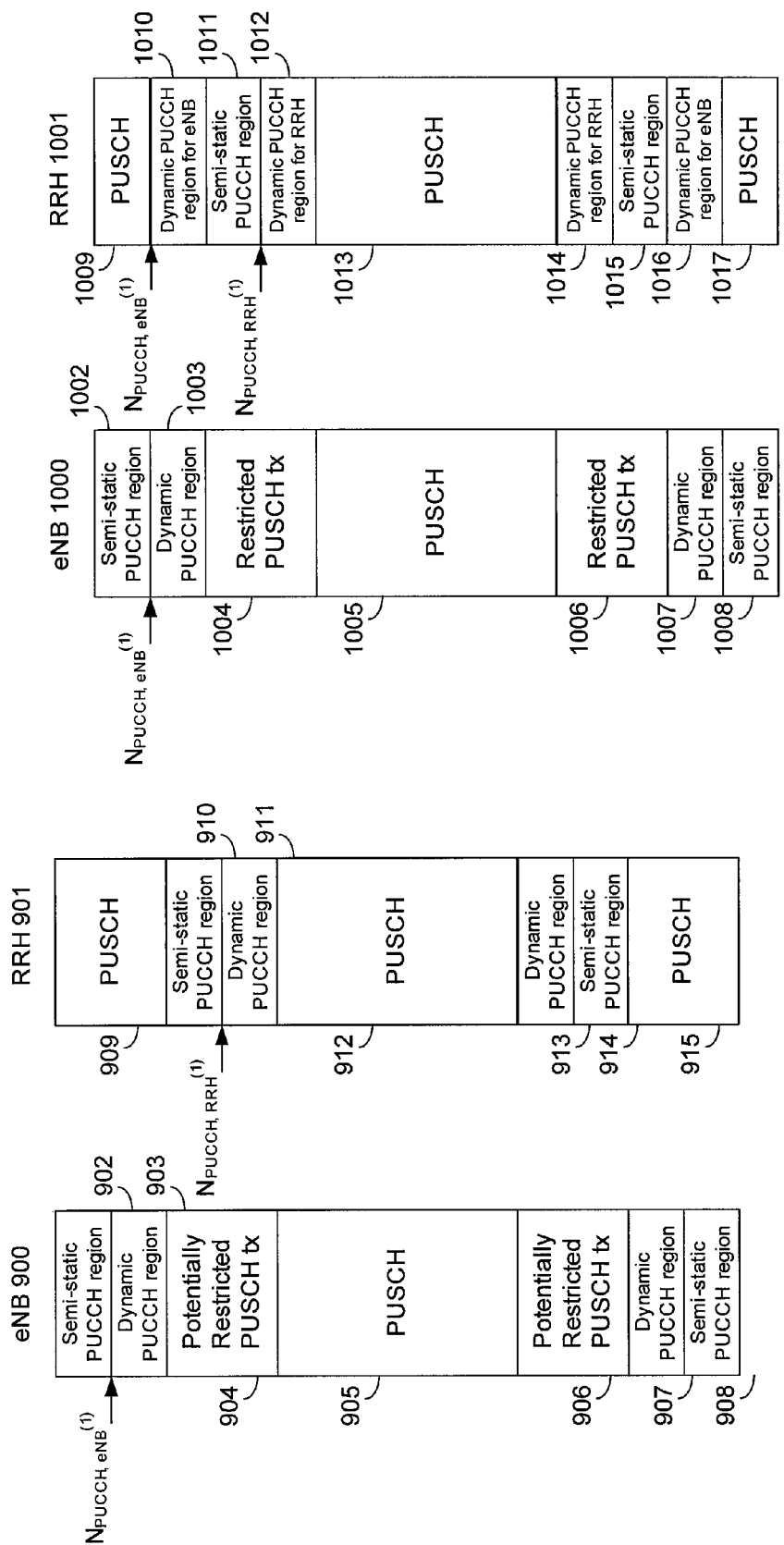

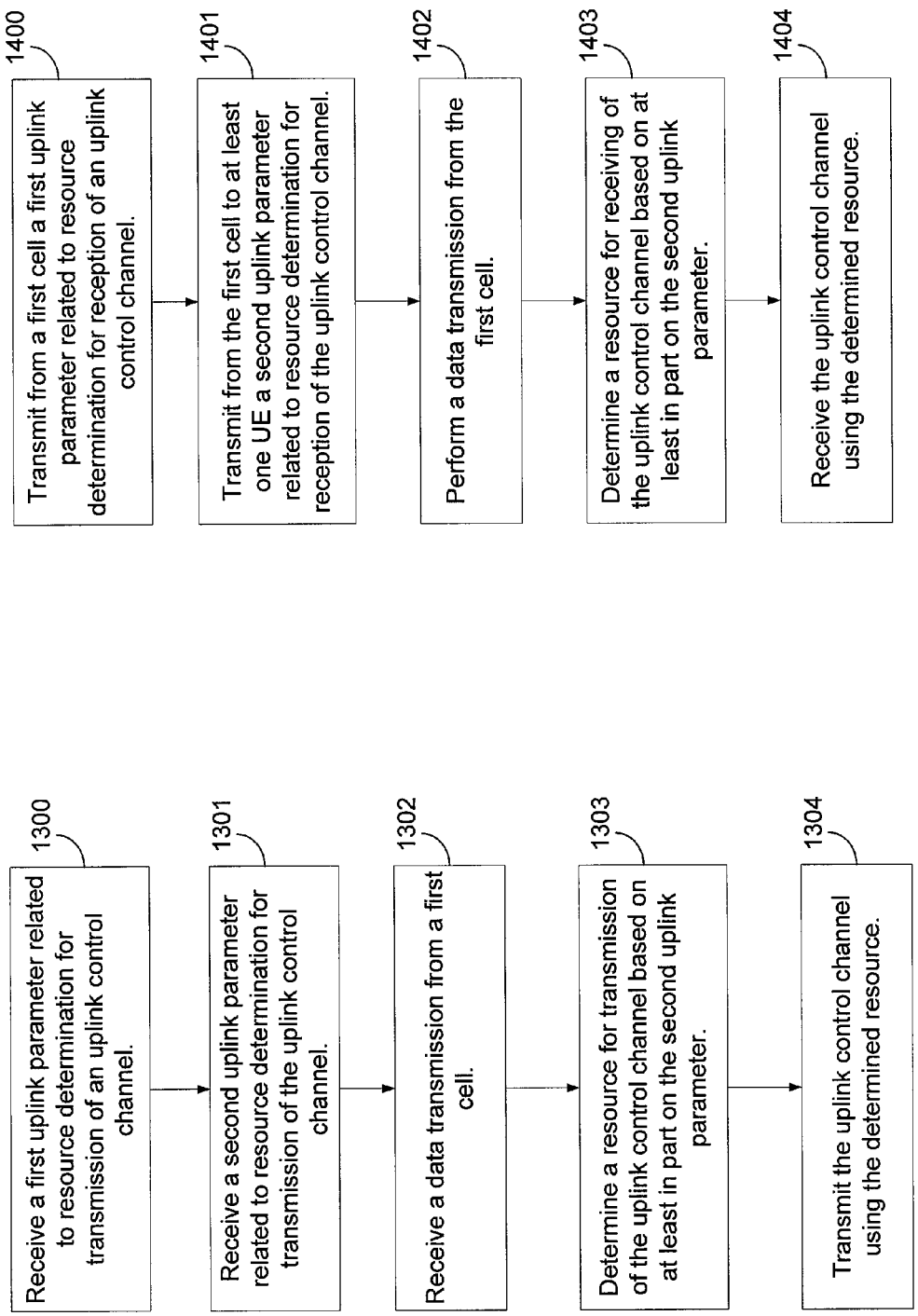

UPLINK RESOURCE MANAGEMENT UNDER COORDINATED MULTIPOINT TRANSMISSION

CROSS-REFERENCE TO RELATED APPLICATIONS

This application claims the benefit of U.S. Provisional Patent Application No. 61/542,442, entitled, "UPLINK RESOURCE MANAGEMENT UNDER COORDINATED MULTIPOINT TRANSMISSION", filed on Oct. 3, 2011, which is expressly incorporated by reference herein in its entirety.

BACKGROUND

1. Field

Aspects of the present disclosure relate generally to wireless communication systems, and more particularly, to uplink resource management under coordinated multipoint (CoMP) Transmission.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the present disclosure are directed to the management and distribution of Physical Uplink Control Channel (PUCCH) resources between first and second eNBs in a CoMP system in which the control and data transmission for a given UE is decoupled. The decoupling of the control and data transmissions allows the first eNB to transmit control information while the second eNB or remote radio head (RRH) transmits data. In such systems, the first eNB communicates a dynamic PUCCH parameter to UEs served in a decoupled manner. The dynamic PUCCH parameter allows the UE to determine uplink communications for the dynamic PUCCH region transmitted to the second eNB in such a position that will not overlap or cause interference with the dynamic PUCCH regions reserved by the first eNB.

In one aspect of the disclosure, a method of wireless communication, including receiving a first uplink parameter related to resource determination for transmission of an uplink control channel, receiving a second uplink parameter related to resource determination for transmission of the uplink control channel, receiving a data transmission from a first cell, determining a resource for transmission of the uplink control channel based on at least in part on the second uplink parameter, and transmitting the uplink control channel using the determined resource.

In an additional aspect of the disclosure, an apparatus configured for wireless communication, including means for receiving a first uplink parameter related to resource determination for transmission of an uplink control channel, means for receiving a second uplink parameter related to resource determination for transmission of the uplink control channel, means for receiving a data transmission from a first cell, means for determining a resource for transmission of the uplink control channel based on at least in part on the second uplink parameter, and means for transmitting the uplink control channel using the determined resource.

In an additional aspect of the disclosure, a computer program product has a computer-readable medium having program code recorded thereon. This program code includes code to receive a first uplink parameter related to resource determination for transmission of an uplink control channel, code to receive a second uplink parameter related to resource determination for transmission of the uplink control channel, code to receive a data transmission from a first cell, code to determine a resource for transmission of the uplink control channel based on at least in part on the second uplink parameter, and code to transmit the uplink control channel using the determined resource.

In an additional aspect of the disclosure, an apparatus includes at least one processor and a memory coupled to the processor. The processor is configured to receive a first uplink parameter related to resource determination for transmission of an uplink control channel, to receive a second uplink parameter related to resource determination for transmission of the uplink control channel, to receive a data transmission from a first cell, to determine a resource for transmission of the uplink control channel based on at least in part on the second uplink parameter, and to transmit the uplink control channel using the determined resource.

In an additional aspect of the disclosure, a method of wireless communication, including transmitting from a first cell a first uplink parameter related to resource determination for reception of an uplink control channel, transmitting from the first cell to at least one UE a second uplink parameter related to resource determination for reception of the uplink control channel, performing a data transmission from the first cell, determining a resource for receiving of the uplink control channel based on at least in part on the second uplink parameter, and receiving the uplink control channel using the determined resource.

In an additional aspect of the disclosure, an apparatus configured for wireless communication, including means for transmitting from a first cell a first uplink parameter related to resource determination for reception of an uplink control channel, means for transmitting from the first cell to at least one UE a second uplink parameter related to resource determination for reception of the uplink control channel, means for performing a data transmission from the first cell, means for determining a resource for receiving of the uplink control channel based on at least in part on the second uplink parameter, and means for receiving the uplink control channel using the determined resource.

In an additional aspect of the disclosure, a computer program product has a computer-readable medium having program code recorded thereon. This program code includes code to transmit from a first cell a first uplink parameter related to resource determination for reception of an uplink control channel, code to transmit from the first cell to at least one UE a second uplink parameter related to resource determination for reception of the uplink control channel, code to perform a data transmission from the first cell, code to determine a resource for receiving of the uplink control channel based on at least in part on the second uplink parameter, and code to receive the uplink control channel using the determined resource.

In an additional aspect of the disclosure, an apparatus includes at least one processor and a memory coupled to the processor. The processor is configured to transmit from a first cell a first uplink parameter related to resource determination for reception of an uplink control channel, to transmit from the first cell to at least one UE a second uplink parameter related to resource determination for reception of the uplink control channel, to perform a data transmission from the first cell, to determine a resource for receiving of the uplink control channel based on at least in part on the second uplink parameter, and to receive the uplink control channel using the determined resource.

BRIEF DESCRIPTION OF THE DRAWINGS

FIG. 9 is a diagram conceptually illustrating PUCCH management configurations for HetNet transmission systems operating without decoupled downlink control and data transmissions.

FIG. 10 is a diagram conceptually illustrating PUCCH management configurations for macro eNB and for RRH for HetNet transmission systems operating with decoupled downlink control and data transmissions.

FIG. 13 is a functional block diagram conceptually illustrating example blocks executed to implement one aspect of the present disclosure.

FIG. 14 is a functional block diagram conceptually illustrating example blocks executed to implement one aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
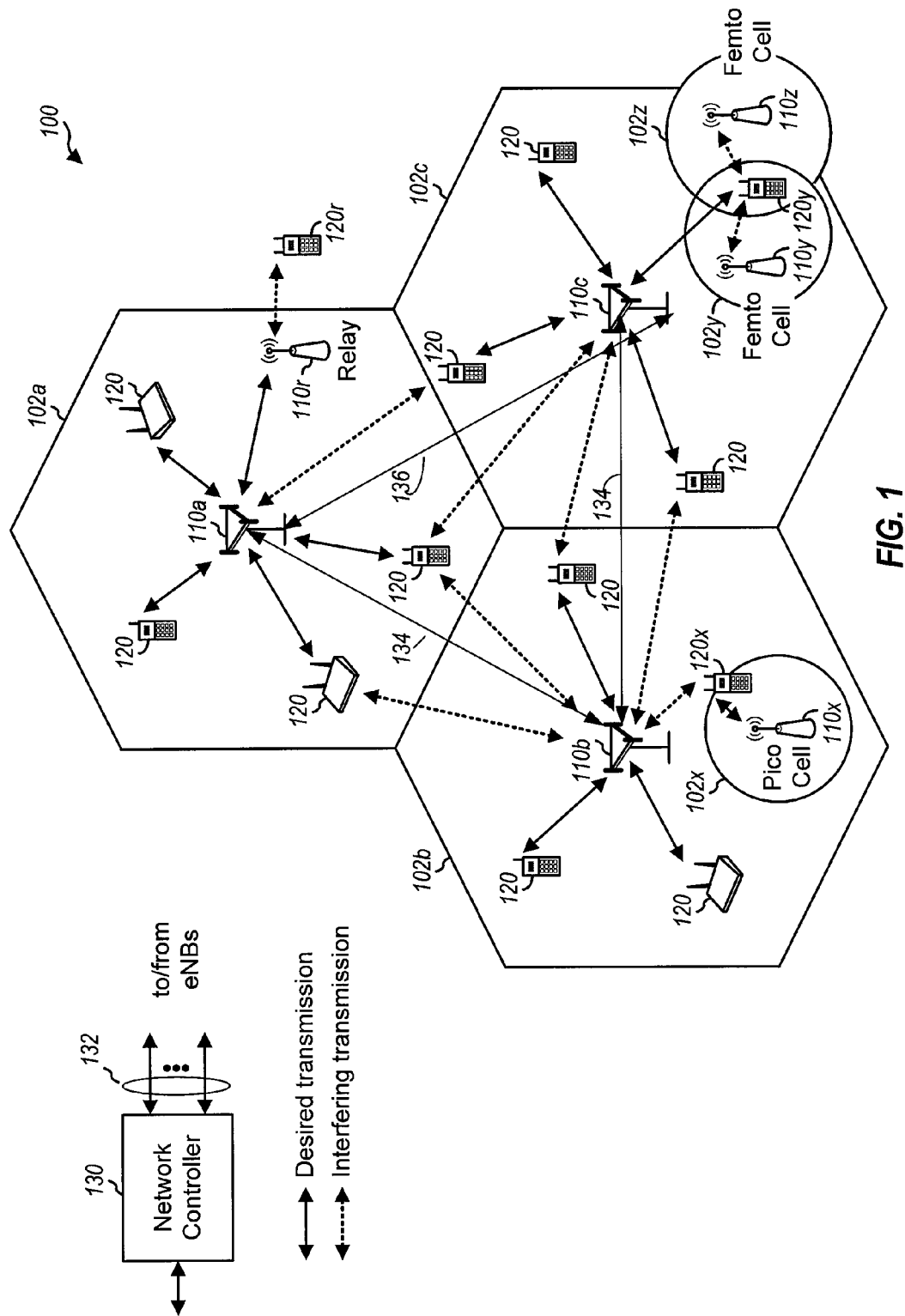
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
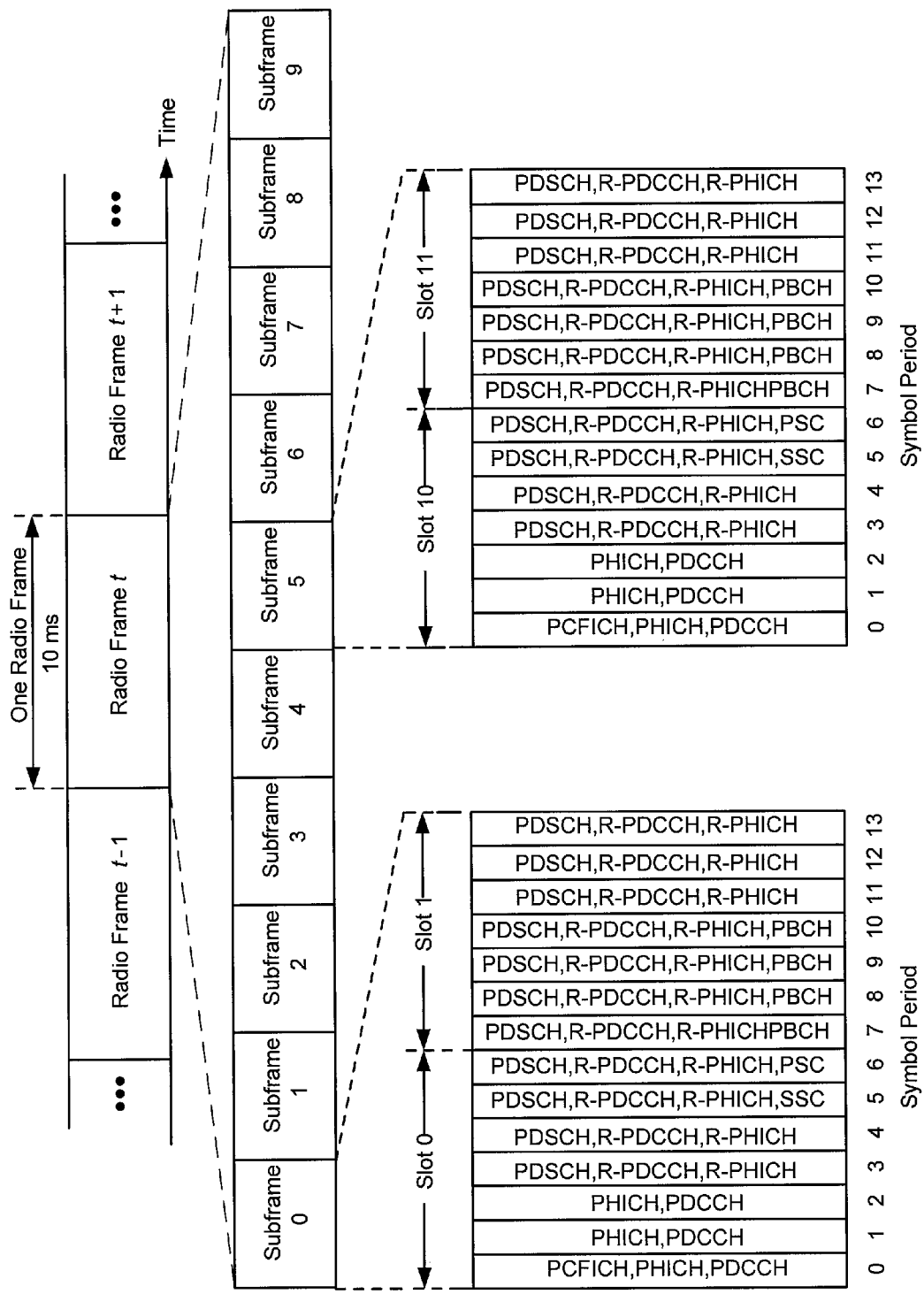
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical H-ARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (H-ARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical H-ARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
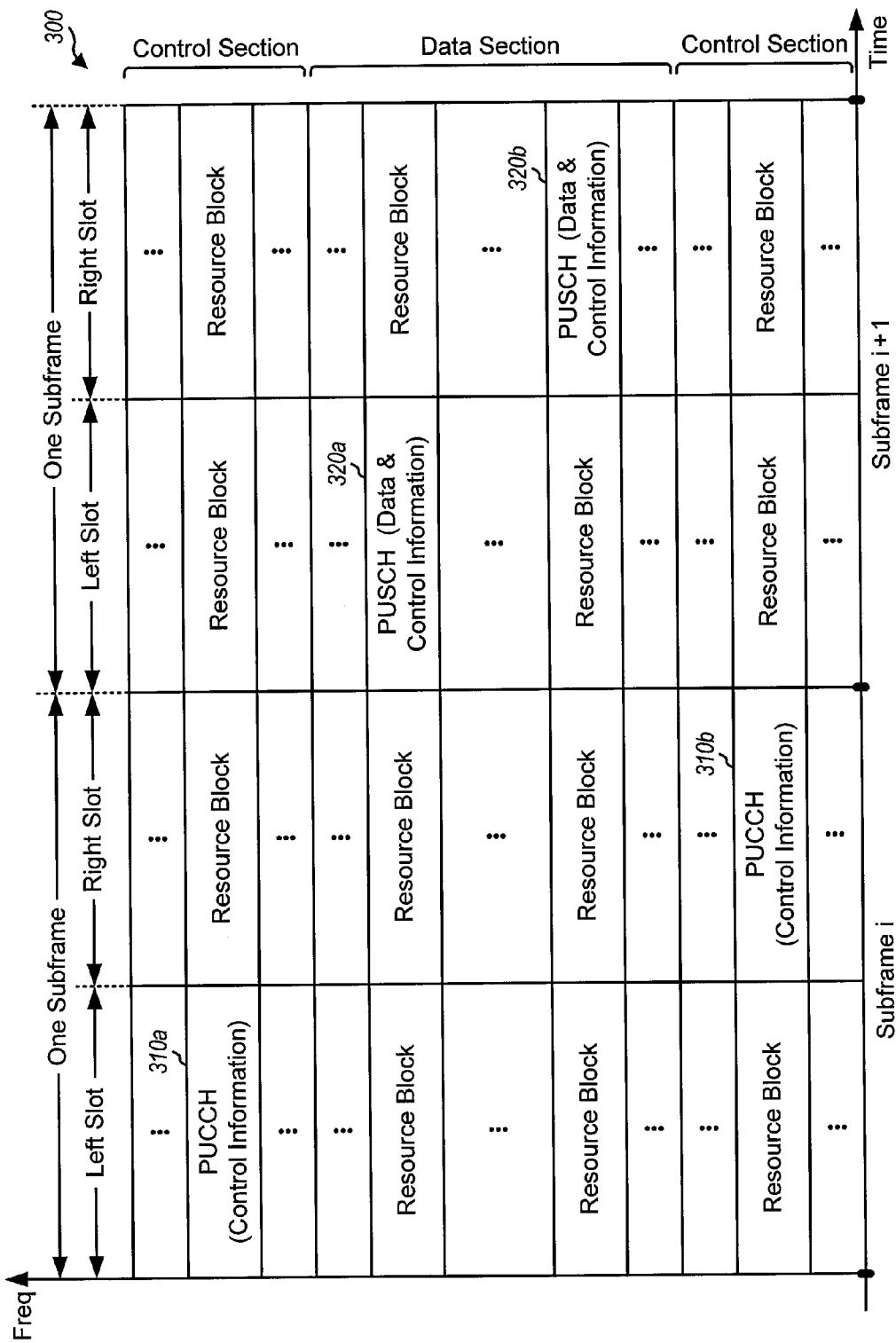
FIG. 3 is a block diagram conceptually illustrating an exemplary frame structure in uplink LTE/-A communications.

FIG. 3 is a block diagram conceptually illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110*a-c* and the pico eNB 110*x* implies that, in a mixed deployment, the downlink coverage area of the pico eNB 110*x* will be much smaller than that of the macro eNBs 110*a-c*.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110*a-c*, limits the benefits of splitting the cell coverage with the pico eNBs, such as the pico eNB 110*x*, because, the higher downlink received signal strength of the macro eNBs 110*a-c* will attract all of the available UEs, while the pico eNB 110*x* may not be serving any UE because of its much weaker downlink transmission power. Moreover, the macro eNBs 110*a-c* will likely not have sufficient resources to efficiently serve those UEs. Therefore, the wireless network 100 will attempt to actively balance the load between the macro eNBs 110*a-c* and the pico eNB 110*x* by expanding the coverage area of the pico eNB 110*x*. This concept is referred to as range extension.

The wireless network 100 achieves this range extension by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources equally between the macro eNBs 110*a-c* and the pico eNB 110*x*. However, even with this active balancing of load, downlink interference from the macro eNBs 110*a-c* should be mitigated for the UEs served by the pico eNBs, such as the pico eNB 110*x*. This can be accomplished by various methods, including interference cancellation at the UE, resource coordination among the eNBs 110, or the like.

In a heterogeneous network with range extension, such as the wireless network 100, in order for UEs to obtain service from the lower-powered eNBs, such as the pico eNB 110*x*, in the presence of the stronger downlink signals transmitted from the higher-powered eNBs, such as the macro eNBs 110*a-c*, the pico eNB 110*x* engages in control channel and data channel interference coordination with the dominant interfering ones of the macro eNBs 110*a-c*. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
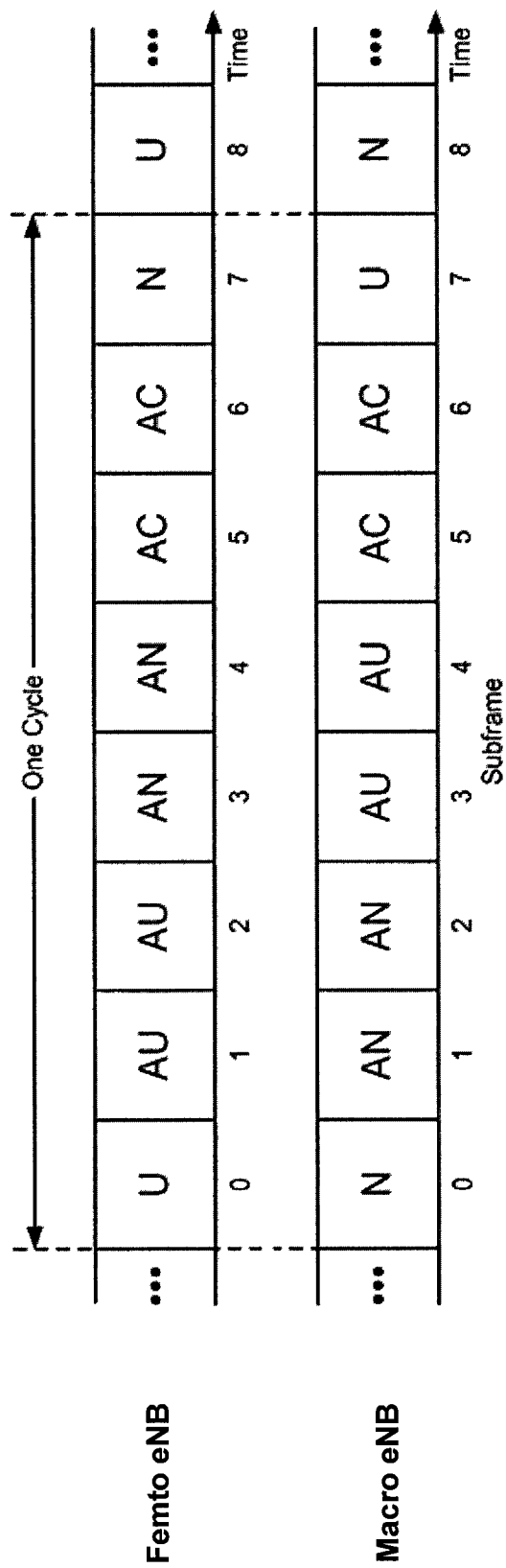
FIG. 4 is a block diagram conceptually illustrating time division multiplexed (TDM) partitioning in a heterogeneous network according to one aspect of the disclosure.

FIG. 4 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 μs (5 km÷3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 5:
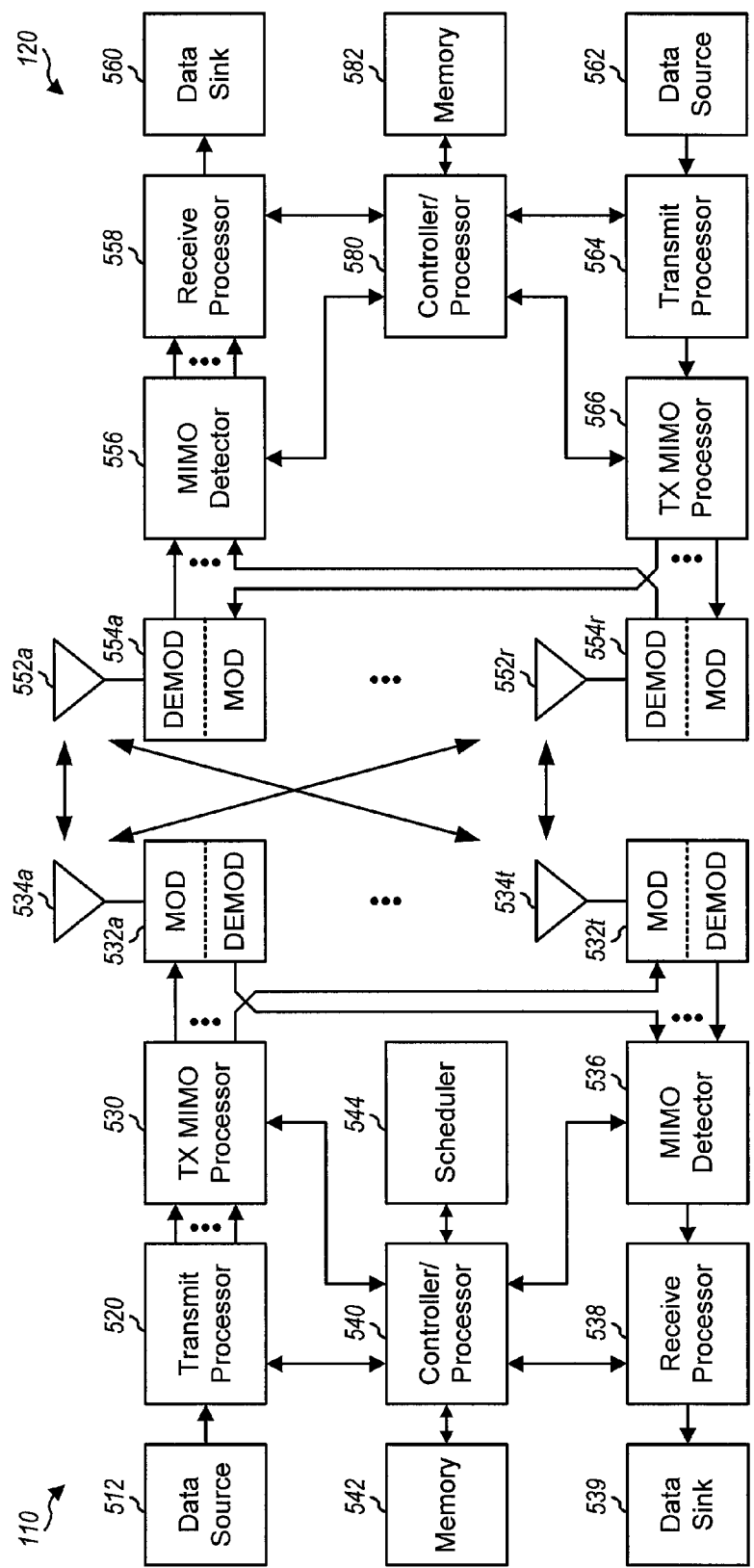
FIG. 5 is a block diagram conceptually illustrating a design of a base station/eNB and a UE configured according to one aspect of the present disclosure.

FIG. 5 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 534a through 534t, and the UE 120 may be equipped with antennas 552a through 552r.

At the eNB 110, a transmit processor 520 may receive data from a data source 512 and control information from a controller/processor 540. The control information may be for the PBCH, PCFICH, PHICH, PDCCH, etc. The data may be for the PDSCH, etc. The transmit processor 520 may process (e.g., encode and symbol map) the data and control information to obtain data symbols and control symbols, respectively. The transmit processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive the downlink signals from the eNB 110 and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The transmit processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the eNB 110. At the eNB 110, the uplink signals from the UE 120 may be received by the antennas 534, processed by the modulators 532, detected by a MIMO detector 536 if applicable, and further processed by a receive processor 538 to obtain decoded data and control information sent by the UE 120. The processor 538 may provide the decoded data to a data sink 539 and the decoded control information to the controller/processor 540.

The controllers/processors 540 and 580 may direct the operation at the eNB 110 and the UE 120, respectively. The controller/processor 540 and/or other processors and modules at the eNB 110 may perform or direct the execution of various processes for the techniques described herein. The controllers/processor 580 and/or other processors and modules at the UE 120 may also perform or direct the execution of the functional blocks illustrated in FIGS. 13 and 14, and/or other processes for the techniques described herein. The memories 542 and 582 may store data and program codes for the eNB 110 and the UE 120, respectively. A scheduler 544 may schedule UEs for data transmission on the downlink and/or uplink.

Coordinated multipoint (CoMP) transmission refers to schemes where multiple base stations coordinate the transmission to one or more UEs. One of the main ideas of CoMP is that when a UE is in the cell-edge or cell range expansion (CRE) region, it may be able to receive signals from multiple cell sites. Moreover, the UE's transmission may also be received at multiple cell sites regardless of the system load. Given that, if the signaling transmitted from the multiple cell sites is coordinated, the downlink performance can be increased significantly. In one example of a CoMP schemes, multiple eNBs transmit the same data intended for the same UE. Such a joint transmission scheme may be implemented by using a joint precoding vector spanning all the antennas of all the involved eNBs. In another example of a CoMP scheme, the eNBs transmit different pieces of data intended for a UE as different MIMO layers. For example, a first layer is sent by a first eNB, a second layer is sent by a second eNB, and a third layer is sent by a third eNB. In still another example of a CoMP scheme, an eNB transmits data to its UE using beams that are selected to reduce interference to UEs in neighboring cells. The various different schemes of CoMP transmission may be used in homogeneous networks and/or heterogeneous networks (HetNet).

In order to facilitate communication between the eNBs involved in a CoMP transmission system, the connection between the nodes may be provided using the X2 interface (some latency, limited bandwidth) or using a fiber connection (min latency and near "unlimited" bandwidth). HetNet CoMP may also employ low power nodes including remote radio heads (RRHs). In systems such as HetNet CoMP systems using low power RRHs, control and data transmissions may be decoupled. That is, control and data transmissions for a UE may be served or transmitted to the UE by different cells or nodes.

Figure 6:
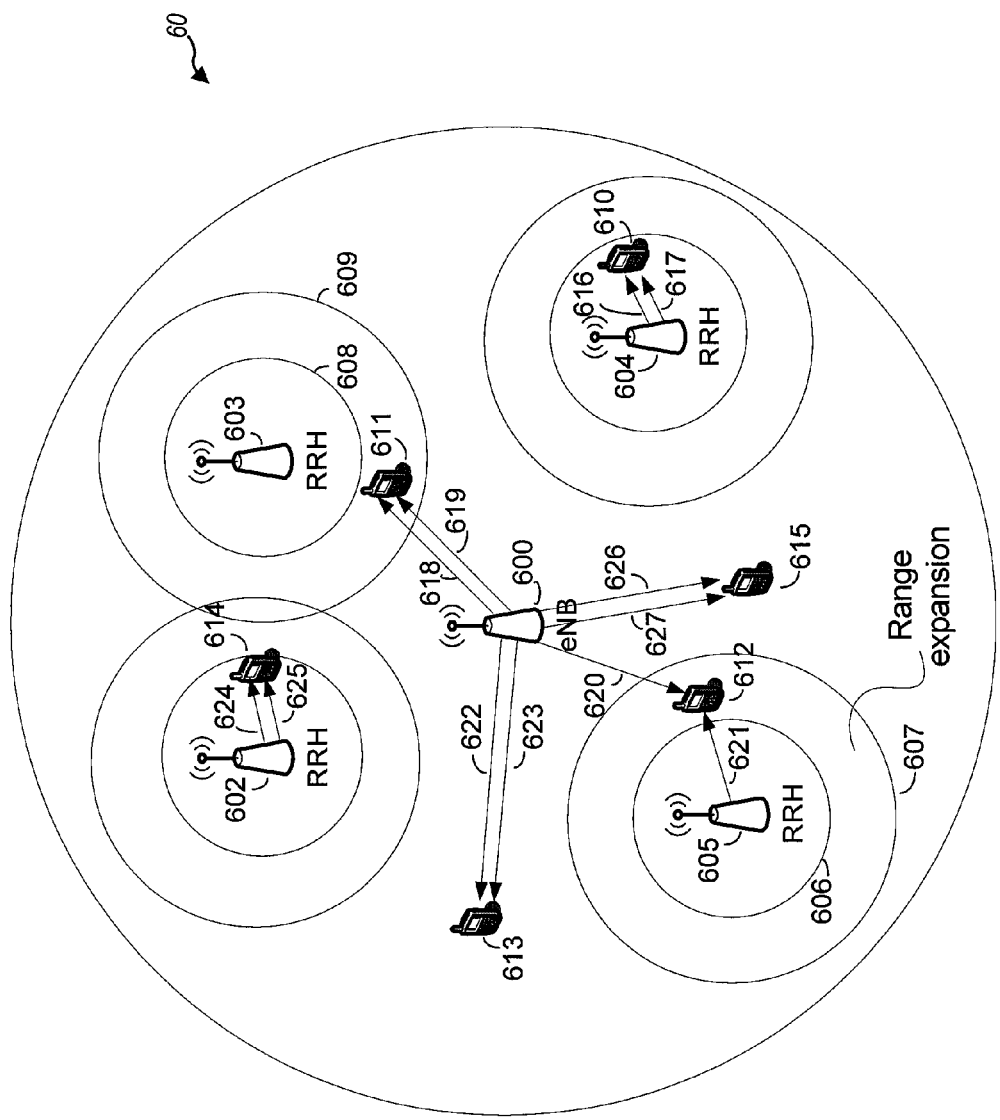
FIG. 6 is a diagram conceptually illustrating a HetNet Comp cell using low power RRHs.

FIG. 6 is a diagram illustrating a HetNet Comp cell, cell 60, using low power RRHs.

Cell 60 is served by macro eNB 600. Within cell 60, multiple RRHs are deployed that provide the HetNet communication through the low power nodes, RRHs 602-605, along with macro node 600. UEs 610 and 614 are located within the coverage zones of RRHs 604 and 602, respectively. RRHs 604 and 602 serve UEs 610 and 614, respectively, under conventional LTE conditions, with data transmissions 616 and 624, and control transmissions 617 and 625 being served by RRHs 604 and 602, respectively. UEs 611 and 612 are within the cell range expansion zones of RRHs 603 and 605, respectively, and between the coverage zones 608 and 606, and the bandwidth edges 609 and 607, respectively. Even though UE 611 is within the range expansion zone of RRH 603, data transmission 618 and control transmission 619 are both served under conventional LTE conditions by macro eNB 600. However, UE 612 receives control transmission 620 from macro eNB 600 decoupled from the data transmission 621 from RRH 605. The UEs 613 and 615 are located only within the coverage zone of macro eNB 600. Therefore, the control transmissions 622 and 627, respectively, and data transmissions 623 and 626, respectively, are provided by macro eNB 600.

The configuration of the decoupled control transmission 620 and data transmission 621 to UE 612 may allow macro eNB 600 to offload data transmission to UEs without interference cancelation capabilities. For example, UE 612 does not have interference capabilities. When analyzing the cell 60, UE 612 may see macro eNB 600 as the strongest cell. Thus, if both control and data transmissions were served by RRH 605, there may be too much interference in the control transmission for UE 612 to accurately handle. Thus, by decoupling control transmission 620 to macro eNB 600, an efficient control and data download process may be established with UE 612.

Figure 7:
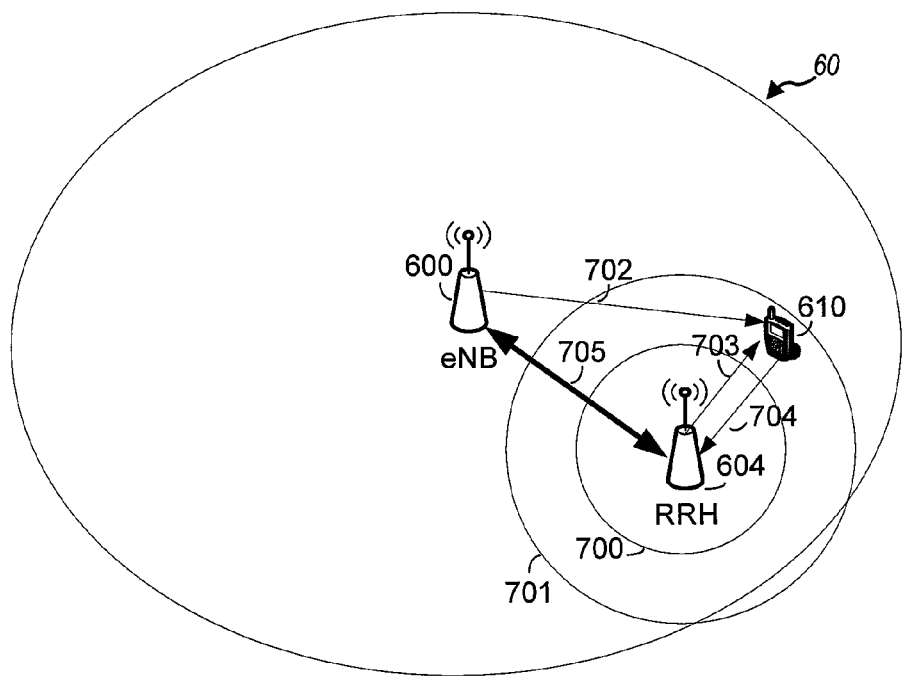
FIG. 7 is a diagram conceptually illustrating cell with decoupled downlink control and data transmissions to UE.

For UEs with decoupled downlink control and data transmission, uplink control and data transmitted by the UEs over PUCCH and Physical Uplink Shared Channel (PUSCH), along with other uplink signals (e.g., sounding reference signals (SRS)), may still be received by the same cell, e.g., the RRH. FIG. 7 is a diagram illustrating cell 60 with decoupled downlink control and data transmissions to UE 610. UE 610, which is located in the cell range expansion area defined by the area between coverage area 700 edge and bandwidth edge 701, receives downlink data transmission 703 from RRH 604 and downlink control transmission 702 from macro eNB 600. For uplink data and control information from UE 610, the path loss seen by UE 610 is much less with regard to RRH 604 than to the serving cell, macro eNB 600. Accordingly, UE 610 transmits such control and data information via PUCCH/PUSCH transmission 704, respectively, to RRH 604, even though UE 610 considers macro eNB 600 as its serving cell. RRH 604 may then transmit the uplink data and control information received from UE 610 to macro eNB 600 over backhaul communication 705.

It should be noted that, while backhaul communication 705 may be conducted over either the X2 interface, fiber, or other low latency/high bandwidth connection, conducting backhaul communication 705 over a fiber or similar low latency/high bandwidth connection may provide less latency in communication.

Figure 8:
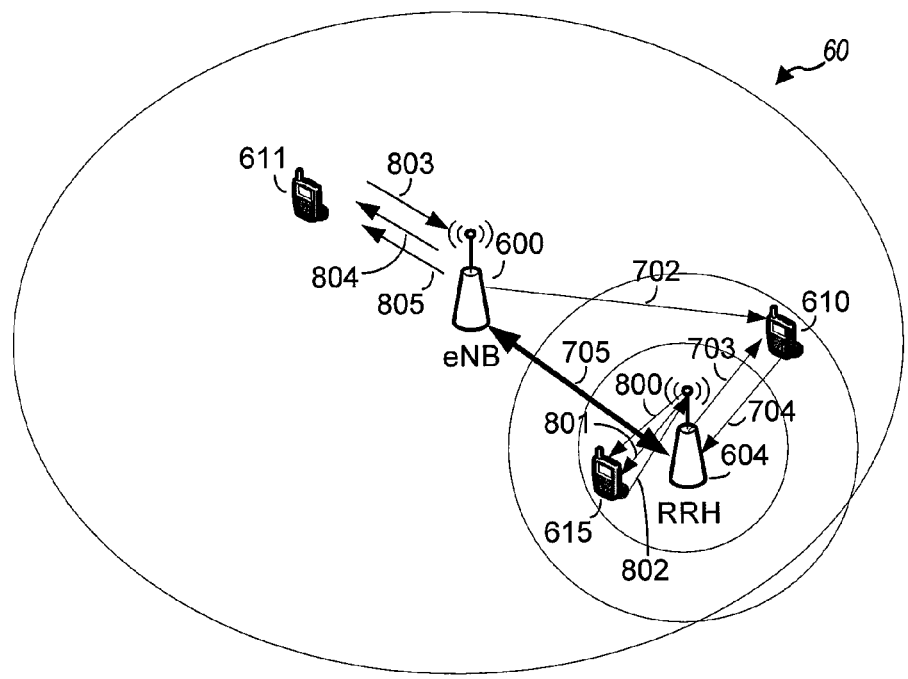
FIG. 8 is a diagram conceptually illustrating a cell in a wireless communication system.

FIG. 8 is a diagram illustrating cell 60. RRH 604 serves data transmission 703 to UE 610 in a decoupled arrangement with macro eNB 600 serving the control transmission 702 to UE 610. RRH 604 also serves both control transmission 800 and data transmission 801 to UE 615 under conventional LTE transmission. UE 610 transmits its uplink control and data information in PUCCH/PUSCH transmission 704 to RRH 604, even though UE 610 considers macro eNB 600 to be its serving cell. UE 615 transmits uplink control and data information in PUCCH/PUSCH transmission 802 also to RRH 604. With RRH 604 receiving PUCCH ACK/NAK information from both UEs 610 and 615, there may be interference between the ACK/NAK information of UEs 610 and 615 unless the ACK/NAK resources are orthogonal. On the downlink side, UE 610 will receive PDCCH information from macro eNB 600 while UE 615 receives its PDCCH information from RRH 604.

Macro eNB 600 also serves UE 611 in conventional LTE by providing both control transmission 803 and data transmission 804 to UE 611. UE 611 transmits its control and data information to macro eNB 600 over PUCCH/PUSCH transmission 805. Because macro eNB 600 also serves UE 610, the ACK/NAK information from UE 610 may also interfere with the ACK/NAK information from UE 611 unless orthogonality is maintained also between these two UEs. Accordingly, in HetNet CoMP transmission systems, PUCCH management for served UEs is beneficial for minimizing interference between ACK/NAK resources caused by the UEs receiving decoupled control and data transmission.

FIG. 9 is a diagram illustrating PUCCH management configurations 900 and 901 for HetNet transmission systems operating without decoupled downlink control and data transmissions. PUCCH management configuration 900 represents the management configuration for the macro eNB 600 (FIG. 6). Beginning with the bandwidth edge, the eNB reserves a semi-static PUCCH region 902. A dynamic PUCCH region 903 is then reserved beginning at the starting position represented by the variable $N_{PUCCH,eNB}^{(1)}$. Macro eNB 600 maintains $N_{PUCCH,eNB}^{(1)}$ and broadcasts this variable to the UEs in order for the UE to know where to transmit PUCCH information on the dynamic PUCCH. The dynamic PUCCH is generally used for transmission of ACK/NAK, while the semi-static PUCCH is generally used to transmit uplink information, such as layer 3 (L3) signaling, CQI, and the like. The reserved dynamic PUCCH region 903 is followed by the potentially restricted PUSCH transmission region 904, the data transmission location of the PUSCH region 905, another potentially restricted PUSCH transmission region 906, another reserved dynamic PUCCH region 907, and another semi-static PUCCH region 908.

In order to manage the PUCCH, such that interference is avoided, the PUCCH management configuration 901, which represents the management configuration for RRH 604 (FIG. 6), schedules semi-static PUCCH regions 910 and 914 and dynamic PUCCH regions 911 and 913 so that they are orthogonal (such that they do not collide) with semi-static PUCCH regions 902 and 908 and dynamic PUCCH regions 903 and 907 of PUCCH management configuration 900 for the macro eNB 600. Accordingly, the illustrated positions of the PUCCH regions may be placed in different locations, than those illustrated so long as orthogonality is maintained between the PUCCH regions. By example, in FIG. 9, a data transmissions in PUSCH region 909 is scheduled first, followed by the semi-static PUCCH region and dynamic PUCCH region 911, which begins at the starting position represented by the variable $N_{PUCCH,RRH}^{(1)}$. PUSCH regions 912 and 915 are also scheduled in PUCCH management configuration 901. As with the macro eNB 600, RRH 604 also maintains $N_{PUCCH,RRH}^{(1)}$ and broadcasts this variable to the served UEs in order for the UEs to know where to schedule the dynamic PUCCH information.

FIG. 10 is a diagram illustrating PUCCH management configurations 1000 (for macro eNB 600) and 1001 (for RRH 604) for HetNet transmission systems operating with decoupled downlink control and data transmissions. PUCCH management configuration 1000 begins with semi-static PUCCH region 1002, followed by dynamic PUCCH region 1003, restricted PUSCH transmission region 1004, data transmission on PUSCH region 1005, another reservation of a restricted PUSCH transmission region 1006, dynamic PUCCH region 1007, and semi-static PUCCH region 1008. PUCCH management configuration 1001 begins with a data transmission region in PUSCH region 1009, followed by dynamic PUCCH for eNB 1010, semi-static PUCCH region 1011, dynamic PUCCH region for RRH 1012, PUSCH region 1013, another dynamic PUCCH region for RRH 1014, semi-static PUCCH region 1015, dynamic PUCCH region for eNB 1016, and PUSCH region 1017.

Under a scheme with decoupled control and data transmissions, the UE treats the macro eNB 600 as the serving cell, and obtains $N_{PUCCH,eNB1}^{(1)}$ (the starting position of dynamic ACK/NAK region) from the macro eNB 600 for the determination of any ACK/NAK resources for PUCCH that it will transmits to RRH 604. UE 615 (FIG. 8) treats RRH 605 as its serving cell and, therefore, obtains $N_{PUCCH,RRH}^{(1)}$ from RRH 604 for the determination of ACK/NAK resource for PUCCH on RRH 604. $N_{PUCCH,eNB}^{(1)}$ and $N_{PUCCH,RRH1}^{(1)}$ are typically set separately by the two cells, although inter-cell coordination is possible.

As is illustrated with PUCCH management configuration 1001, RRH 604 reserves two sets of dynamic PUCCH regions, one for itself, dynamic PUCCH region 1012, and the other, dynamic PUCCH region 1010, for UEs with PDCCH from macro eNB 600. Because the dynamic PUCCH region 1010 is used for a UE that is being served by macro eNB 600, that UE will obtain $N_{PUCCH,eNB}^{(1)}$ from macro eNB 600. Thus, it is positioned in PUCCH management configuration 1001 in a position that would collide with the dynamic PUCCH region 1003. The two dynamic regions also make it difficult to reuse for PUSCH. For example, if 4 resource blocks (RBs) have been reserved for potential PUCCH transmission, if the actual use by UEs only uses 1 of those assigned RBs, when two dynamic regions are configured, it becomes a more complex process to reuse the RBs in two different regions, especially in the configuration, as illustrated in FIG. 10, the two dynamic PUCCH regions 1010 and 1012 are not contiguous. More importantly, dynamic PUCCH region 1003 in the PUCCH management configuration 1000 for macro eNB 600 and the dynamic PUCCH region for eNB 1010 in the PUCCH management configuration 1001 for RRH 604 may interfere with each other.

Figures 11, 12:
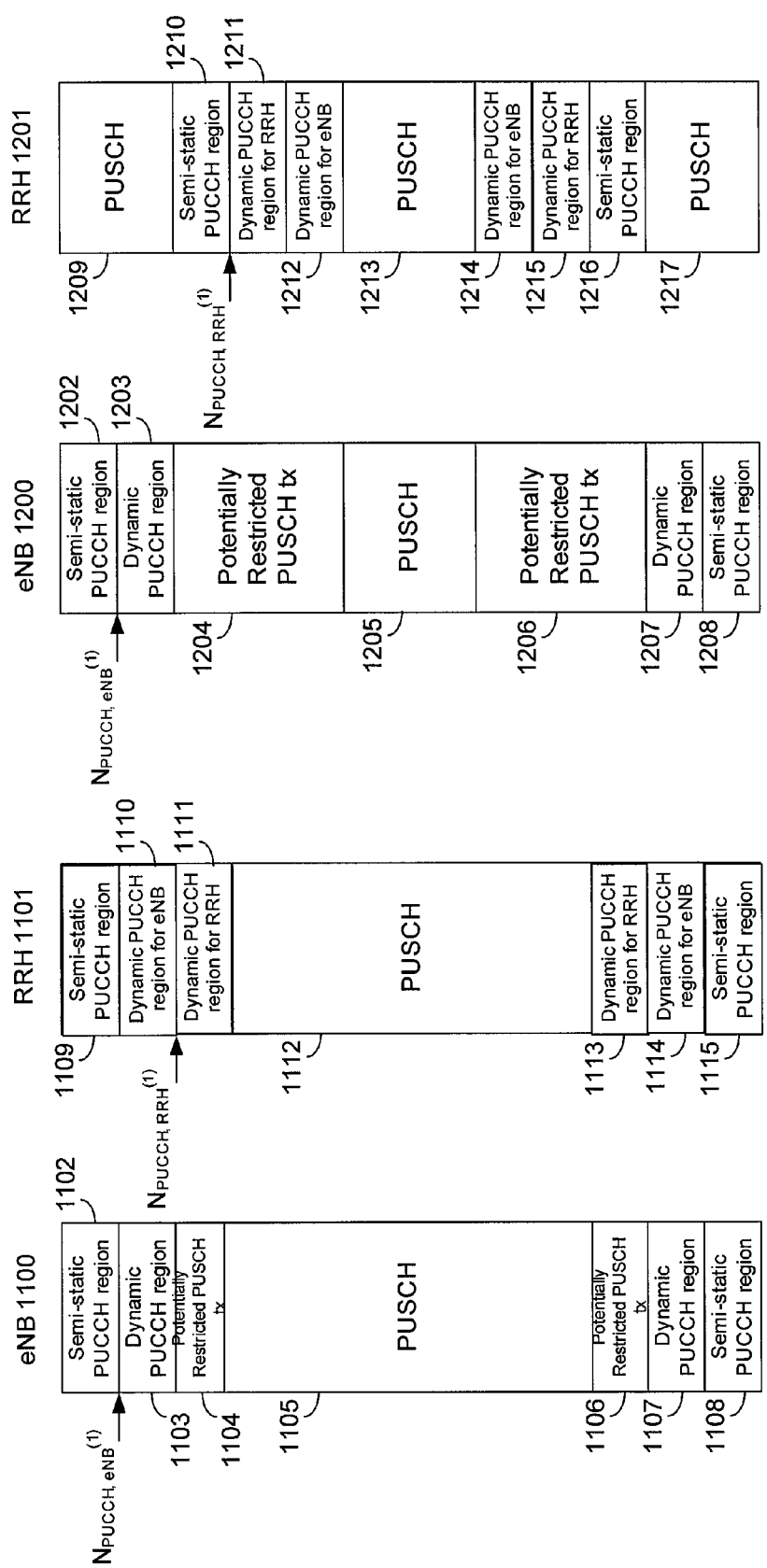
FIG. 11 is a diagram conceptually illustrating PUCCH management configurations for macro eNB and for a RRH for HetNet transmission systems operating with decoupled downlink control and data transmissions.
FIG. 12 is a diagram conceptually illustrating PUCCH management configurations for a serving cell and for an RRH for HetNet transmission systems operating with decoupled downlink control and data transmissions.

FIG. 11 is a diagram illustrating PUCCH management configurations 1100 (for macro eNB 600) and 1101 (for RRH 604) for HetNet transmission systems operating with decoupled downlink control and data transmissions. PUCCH management configuration 1100 begins with semi-static PUCCH region 1102, followed by dynamic PUCCH region 1103, restricted PUSCH transmission region 1104, data transmission on PUSCH region 1105, another reservation of a restricted PUSCH transmission region 1106, dynamic PUCCH region 1107, and semi-static PUCCH region 1108. PUCCH management configuration 1101 begins now with semi-static PUCCH region 1109 followed by dynamic PUCCH region for eNB 1110, dynamic PUCCH region for RRH 1111, beginning at $N_{PUCCH,RRH}^{(1)}$, PUSCH region 1112, another dynamic PUCCH region for RRH 1113, dynamic PUCCH region for eNB 1114, and semi-static PUCCH region 1115.

As illustrated, the setting of $N_{PUCCH,eNB}^{(1)}$ and $N_{PUCCH,RRH}^{(1)}$ can be such that the overlap of the two dynamic regions on RRH (one for macro eNB 600 and the other for RRH 604) is well controlled or minimized, in order to avoid ACK/NAK collisions. However, the dynamic PUCCH region 1103 in the PUCCH management configuration 1100 for the macro eNB 600 may interfere with the dynamic PUCCH region for eNB 1110 on the PUCCH management configuration 1101 for RRH 604.

In order to address such potential collisions and interference between the dynamic PUCCH regions, the dynamic PUCCH region for the macro eNB 600 in the PUCCH configuration for the RRH 604 may be moved to a region where it is protected from interference from the macro eNB 600 and for better integration with the dynamic PUCCH region for RRH 604. FIG. 12 is a diagram illustrating PUCCH management configurations 1200 (for macro eNB 600) and 1201 (for RRH 604) for HetNet transmission systems operating with decoupled downlink control and data transmissions. PUCCH management configuration 1200 begins with semi-static PUCCH region 1202, followed by dynamic PUCCH region 1203, restricted PUSCH transmission region 1204, data transmission on PUSCH region 1205, another reservation of a restricted PUSCH transmission region 1206, dynamic PUCCH region 1207, and semi-static PUCCH region 1208. PUCCH management configuration 1201 begins with a data transmission region in PUSCH region 1209, followed by semi-static PUCCH region 1210, dynamic PUCCH region for RRH 1211 beginning at $N_{PUCCH,RRH}^{(1)}$, dynamic PUCCH for eNB 1212, PUSCH region 1213, another dynamic PUCCH region for eNB 1214, dynamic PUCCH region for RRH 1215, semi-static PUCCH region 1216, and PUSCH region 1217.

The dynamic PUCCH region for eNB 1212 is positioned to avoid collision with the dynamic PUCCH region 1203 by introducing a UE-specific or cell-specific parameter (an offset or a new starting index). This parameter may be delivered by the node via either dedicated signaling or broadcast if the parameter is cell-specific. The parameter may be delivered by the macro eNB 600. Alternatively, the parameter may be delivered by the RRH 604. When the UE with decoupled control and data transmissions receives the parameter, it will then transmit the ACK/NAK on the PUCCH to the low power non-serving eNB in the dynamic PUCCH region located as identified in the parameter. When the parameter is an offset, the UE will begin with the location identified by $N_{PUCCH,eNB}^{(1)}$ and then add the offset value of the parameter to the $N_{PUCCH,eNB}^{(1)}$ value. In alternative aspects, when the parameter is a new starting index, the UE will be at the new index, either disregarding the $N_{PUCCH,eNB}^{(1)}$ value or not obtaining the value. The resulting location of the dynamic PUCCH region for the low power non-serving eNB will possibly avoid collision with the dynamic PUCCH region for the serving eNB.

It should be noted that the when implemented, the decoupling PUCCH parameter may cause the two dynamic PUCCH regions for the low power non-serving eNB to overlap, partially or completely. The balance of uplink overhead and downlink scheduling restriction is determined by the eNB implementation.

It should further be noted that in additional aspects of the present disclosure, a serving eNB in a decoupled control and data transmission relationship with one or more UEs may also support signaling additional parameters besides the new parameter for PUCCH region management. For example, another parameter may allow the semi-static PUCCH region to be arranged in an efficient manner within the PUCCH management configuration for the non-serving node. In still another example, another possible parameter may signal for use of a separate physical cell identifier (PCI) (which can be different from the PCI of the serving cell, which is acquired from the downlink common reference signal (CRS)) for uplink operation of UEs in a HetNet CoMP transmission configuration. The new signaled PCI, which may be referred to as a virtual PCI, would be intended for more integrated uplink operations of those UEs being served with decoupled control and data transmissions. Thus, the PCI used by the UE will be the same PCI for the eNB that will receive uplink communication from the UE.

From the perspective of the UE in the decoupled control/data transmission configuration, the communication process with the two separate nodes is no longer completely transparent. The UE, in receiving the new PUCCH parameter, discovers a difference in the transmission when transmitting control and data to a serving eNB from when the control and data are transmitted to a non-serving eNB. FIG. 13 is a functional block diagram illustrating example blocks executed to implement one aspect of the present disclosure.

At block 1300, a first uplink parameter is received related to resource determination for transmission of an uplink control channel. With reference to the elements illustrated in FIGS. 6-8, in operation, a UE, such as UE 610, receives control information from a base station, such as eNB 600 or RRH 604. The control information may include the location where the dynamic PUCCH region of eNB 600 begins. This location is generally transmitted as $N_{PUCCH,eNB}^{(1)}$. Using this information UE 610 would know the resources on which to send ACK/NAK information.

A second uplink parameter is received, at block 1301, related to resource determination for transmission of the uplink control channel. The second uplink parameter may instruct the UE, such as UE 610, where to deliver its ACK/NAK on the PUCCH to the non-serving base station. The second uplink parameter may either be a new location or starting index or an offset. This second uplink parameter will be used by UE 610 to schedule ACK/NAK to the non-serving base station that will possibly avoid collision with the dynamic PUCCH region of the serving base station. It may be transmitted by either base station, e.g., eNB 600 or RRH 604. If it is a cell-specific parameter, it may also be broadcast across the cell for served UEs to obtain.

The UE receives a data transmission from a first cell, at block 1302. A UE, such as UE 610, receives data transmissions from the cell designated for delivering data. For example, UE 610 may receive the data transmissions from one of eNB 600 or RRH 604.

At block 1303, the UE determines a resource for transmission of the uplink control channel based on at least in part on the second uplink parameter. The UE, such as UE 610, will determine the resources for uplink control information based at least in part of the second uplink parameter as it schedules uplink transmissions. When this second uplink parameter is configured as a new starting index, UE 610 may either disregard $N_{PUCCH,eNB}^{(1)}$ or not even obtain it. When configured as an offset, UE 610 would begin with $N_{PUCCH,eNB}^{(1)}$ and add the offset to arrive at the new location that will possibly avoid collision with the dynamic PUCCH region for the non-serving base station.

The UE then transmits the uplink control channel, at block 1304, using the determined resource. The UE, such as UE 610, will use the determined resources to transmit the control information for the non-serving base station in a dynamic PUCCH region that does not collide with the dynamic PUCCH region for the serving base station.

FIG. 14 is a functional block diagram illustrating example blocks executed to implement one aspect of the present disclosure.

At block 1400, a first cell transmits a first uplink parameter related to resource determination for reception of an uplink control channel. With reference to the elements illustrated in FIGS. 6-8, in operation, a base station, such as eNB 600 or RRH 604, compiles and transmits control information to a UE, such as UE 610. The control information may include the location where the dynamic PUCCH region of the serving base station, such as eNB 600, begins. This location is generally transmitted as $N_{PUCCH,eNB}^{(1)}$. Using this information UE 610 would know the resources on which to send ACK/NAK information.

The first cell transmits, at block 1401, to at least one UE a second uplink parameter related to resource determination for reception of the uplink control channel. The second uplink parameter may be transmitted by either base station, e.g., eNB 600 or RRH 604 and may instruct the UE, such as UE 610, where to deliver its ACK/NAK on the PUCCH to the non-serving base station. As noted above, this second uplink parameter will be used by UE 610 to schedule ACK/NAK to the non-serving base station that will possibly avoid collision with the dynamic PUCCH region of the serving base station.

At block 1402, the first cell performing a data transmission. The base station designated for transmitting data to UE 610, which may be either eNB 600 or RRH 604, transmit that data to UE 610 over the air interface.

It then determines a resource, at block 1403, for receiving of the uplink control channel based on at least in part on the second uplink parameter. When a UE, such as UE 610, receives the second uplink parameter, it will determine the location and resources on which it will send its control information. Once the second uplink parameter is sent by the base station, e.g., either eNB 600 or RRH 604, it will then determine what that location and resources will be. Using the second uplink parameter, the sending base station will identify the resources that it expects to receive the control information from UE 610.

At block 1404, the first cell receives the uplink control channel using the determined resource. Once the resources on which the uplink control information or channel are determined, the sending base station, either eNB 600 or RRH 604, will receive the control information from the serviced UE, such as UE 610.

Figure 15:
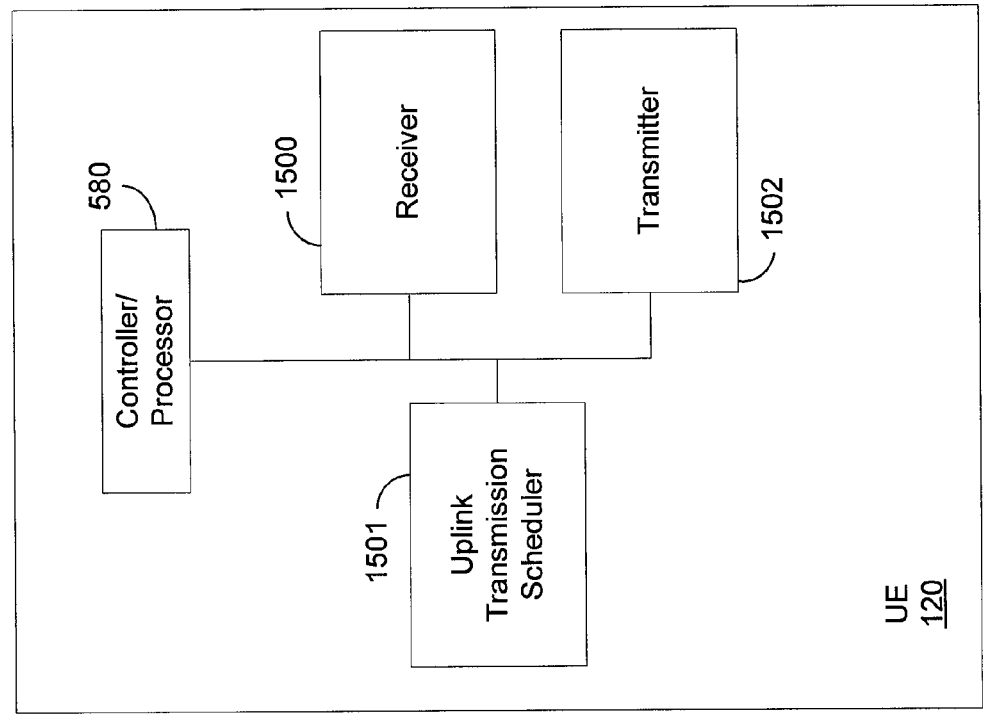
FIG. 15 is a block diagram conceptually illustrating a UE configured according to one aspect of the present disclosure.

FIG. 15 is a block diagram conceptually illustrating a UE 120 configured according to one aspect of the present disclosure. The UE 120 includes a controller/processor 580 which executes various functions and components to operate, manage, and control the functionality of the UE 120. A receiver 1500, under control of the controller/processor 580 provides means for receiving a first uplink parameter related to resource determination for transmission of an uplink control channel. The receiver 1500 also provides means receiving a second uplink parameter related to resource determination for transmission of the uplink control channel and means for receiving a data transmission from a first cell. UE 120 also includes an uplink transmission scheduler 1501, under control of the controller/processor 580. The uplink transmission scheduler 1501 uses the uplink transmission parameter to adjust uplink transmissions transmitted to the second cell via transmitter 1502. The uplink transmission parameter may be any number of various values, such as an offset for a dynamic or semi-static PUCCH transmission, a new index for the dynamic or semi-static PUCCH transmission, a PCI, and the like. Using at least the second uplink parameter, uplink transmission scheduler 1501, under control of controller/processor 580, determines a resource for transmission of the uplink control channel. The combination of these components and acts provides means for determining a resource for transmission of the uplink control channel based on at least in part on the second uplink parameter. Transmitter 1502, under control of controller/processor 580, may then transmit the uplink control channel using the determined resources. The transmitter 1502 and controller/processor 580 provide means for transmitting the uplink control channel using the determined resource.

Figure 16:
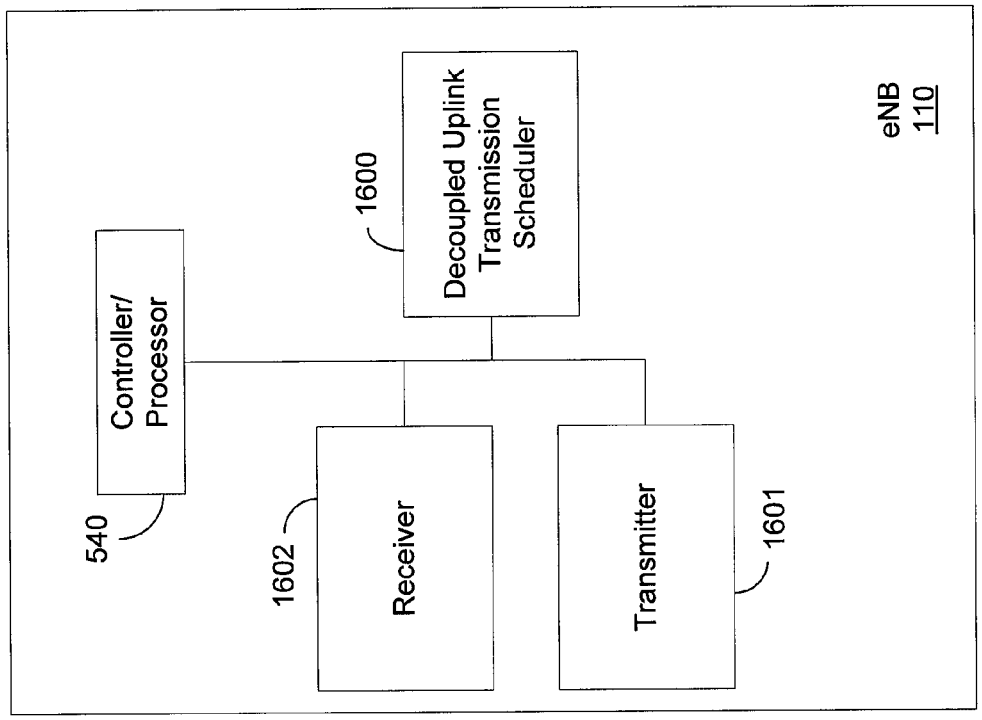
FIG. 16 is a block diagram conceptually illustrating an eNB that may be configured as an RRH or macro eNB according to aspects of the present disclosure.

FIG. 16 is a block diagram conceptually illustrating an eNB 110 that may be configured as an RRH or macro eNB according to aspects of the present disclosure. The eNB 110 includes a controller/processor 540 which executes various functions and components to operate, manage, and control the functionality of the eNB 110. The eNB 110 may be configured to operate as a macro eNB in certain aspects, or as an RRH in other aspects. In a decoupled control and data transmission configuration, when configured as the macro eNB, eNB 110 transmits control information via transmitter 1601 to an associated UE. When configured as the RRH in such a decoupled communication configuration, eNB 110 transmits only data to the associated UE via transmitter 1601. In either aspect, a decoupled uplink transmission scheduler 1600 and transmitter 1601 of eNB 110, under control of the controller/processor 540, provides the means for transmitting a first uplink parameter related to resource determination for reception of an uplink control channel. This combination of components and acts also provides means for transmitting to at least one UE a second uplink parameter related to resource determination for reception of the uplink control channel and means for performing a data transmission. The uplink transmission parameter instructs the UE where to transmit uplink information based, at least in part, on the uplink transmission parameter. The second uplink parameter is used by decoupled uplink transmission scheduler 1600, under control of controller/processor 540, to determine a resource for receiving the uplink control channel. The combination of these components and acts provides means for determining a resource for receiving of the uplink control channel based on at least in part on the second uplink parameter. Receiver 1602, under control of controller/processor 540, may then receive transmissions directed to eNB 110, including the uplink control channel using the determined resources. The combination of these components and acts provides means for receiving the uplink control channel using the determined resource.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 13 and 14 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving a first uplink parameter related to resource determination for transmission of an uplink control channel, wherein the first link parameter is a first starting index of the uplink control channel;
   receiving a second uplink parameter related to resource determination for transmission of the uplink control channel, wherein the second link parameter is a second starting index of the uplink control channel;
   receiving a data transmission from a first cell;
   determining a resource for transmission of the uplink control channel based at least in part on the second uplink parameter; and
   transmitting the uplink control channel using the determined resource.

2. The method of claim 1, wherein determining the resource is further based on the first uplink parameter.

3. The method of claim 1, further comprising receiving a downlink control channel.

4. The method of claim 3, wherein the downlink control channel is received from a second cell.

5. The method of claim 3, wherein the resource determination is further based at least in part on a parameter associated with the downlink control channel.

6. The method of claim 5, wherein the parameter is one of: a starting control channel element (CCE) index of a legacy control channel, and a starting enhanced CCE index of a new control channel.

7. The method of claim 1 wherein the uplink control channel carries at least a H-ARQ response.

8. The method of claim 1, wherein the first uplink parameter is received via a broadcast transmission and the second uplink parameter is received via a unicast transmission.

9. The method of claim 4, wherein the determination of the resource is performed when the uplink control channel is based on a virtual cell identifier, separately configured from a physical cell identifier (PCI) associated with the second cell.

10. The method of claim 4, wherein the first cell is distinct from the second cell.

11. The method of claim 4, wherein the first cell is the same as the second cell.

12. The method of claim 1, wherein receiving the first uplink parameter includes receiving an uplink parameter related to resource determination for transmission of an uplink control channel to a first base station, and wherein receiving the second uplink parameter includes receiving an uplink parameter related to resource determination for transmission of the uplink control channel to a second base station.

13. A method of wireless communication, comprising:
    transmitting from a first cell a first uplink parameter related to resource determination for reception of an uplink control channel, wherein the first link parameter is a first starting index of the unlink control channel;
    transmitting from the first cell to at least one user equipment (UE) a second uplink parameter related to resource determination for reception of the uplink control channel, wherein the second link parameter is a second starting index of the uplink control channel;
    performing a data transmission from the first cell;
    determining a resource for receiving of the uplink control channel based at least in part on the second uplink parameter; and
    receiving the uplink control channel using the determined resource.

14. The method of claim 13, wherein determining the resource is further based on the first uplink parameter.

15. The method of claim 13, further comprising transmitting a downlink control channel.

16. The method of claim 15, wherein the downlink control channel is transmitted from a second cell.

17. The method of claim 15, wherein the resource determination is further based at least in part on a parameter associated with the downlink control channel.

18. The method of claim 17, wherein the parameter is one of: a starting control channel element (CCE) index of a legacy control channel, and a starting enhanced CCE index of a new control channel.

19. The method of claim 13, wherein the uplink control channel carries at least a H-ARQ response.

20. The method of claim 13, wherein the first uplink parameter is transmitted via a broadcast message and the second uplink parameter is a transmission via a unicast message.

21. The method of claim 16, further comprising configuring a virtual cell identified for the at least one UE, where the virtual cell identified is separately configured from a physical cell identifier associated with the second cell.

22. The method of claim 16, wherein the first cell is distinct from the second cell.

23. The method of claim 16, wherein the first cell is the same as the second cell.

24. The method of claim 13, further comprising determining a second resource for receiving of the uplink control channel based on the first uplink parameter and a parameter associated with a downlink control channel for a second UE.

25. The method of claim 24, wherein the determined second resource is orthogonal to the resource determined based on at least in part on the second uplink parameter.

26. An apparatus configured for wireless communication, comprising:
   means for receiving a first uplink parameter related to resource determination for transmission of an uplink control channel, wherein the first link parameter is a first starting index of the uplink control channel;
   means for receiving a second uplink parameter related to resource determination for transmission of the uplink control channel, wherein the second link parameter is a second starting index of the uplink control channel;
   means for receiving a data transmission from a first cell;
   means for determining a resource for transmission of the uplink control channel based at least in part on the second uplink parameter; and
   means for transmitting the uplink control channel using the determined resource.

27. The apparatus of claim 26, wherein means for determining the resource is further based on the first uplink parameter.

28. The apparatus of claim 26, further comprising means for receiving a downlink control channel.

29. The apparatus of claim 28, wherein the downlink control channel is received from a second cell.

30. The apparatus of claim 28, wherein the resource determination is further based at least in part on a parameter associated with the downlink control channel.

31. The apparatus of claim 30, wherein the parameter is one of: a starting control channel element (CCE) index of a legacy control channel, and a starting enhanced CCE index of a new control channel.

32. The apparatus of claim 26 wherein the uplink control channel carries at least a H-ARQ response.

33. The apparatus of claim 26, wherein the first uplink parameter is received via a broadcast transmission and the second uplink parameter is received via a unicast transmission.

34. The apparatus of claim 29, wherein the determination of the resource is performed when the uplink control channel is based on a virtual cell identifier, separately configured from a physical cell identifier (PCI) associated with the second cell.

35. The apparatus of claim 29, wherein the first cell is distinct from the second cell.

36. The apparatus of claim 29, wherein the first cell is the same as the second cell.

37. The apparatus of claim 26, wherein the means for receiving the first uplink parameter includes means for receiving an uplink parameter related to resource determination for transmission of an uplink control channel to a first base station, and wherein the means for receiving the second uplink parameter includes means for receiving an uplink parameter related to resource determination for transmission of the uplink control channel to a second base station.

38. An apparatus configured for wireless communication, comprising:
   means for transmitting from a first cell a first uplink parameter related to resource determination for reception of an uplink control channel, wherein the first link parameter is a first starting index of the uplink control channel;
   means for transmitting from the first cell to at least one user equipment (UE) a second uplink parameter related to resource determination for reception of the uplink control channel, wherein the second link parameter is a second starting index of the uplink control channel;
   means for performing a data transmission from the first cell;
   means for determining a resource for receiving of the uplink control channel based at least in part on the second uplink parameter; and
   means for receiving the uplink control channel using the determined resource.

39. The apparatus of claim 38, wherein the means for determining the resource is further based on the first uplink parameter.

40. The apparatus of claim 38, further comprising means for transmitting a downlink control channel.

41. The apparatus of claim 40, wherein the downlink control channel is transmitted from a second cell.

42. The apparatus of claim 40, wherein the resource determination is further based at least in part on a parameter associated with the downlink control channel.

43. The apparatus of claim 42, wherein the parameter is one of: a starting control channel element (CCE) index of a legacy control channel, and a starting enhanced CCE index of a new control channel.

44. The apparatus of claim 38, wherein the uplink control channel carries at least a H-ARQ response.

45. The apparatus of claim 38, wherein the first uplink parameter is transmitted via a broadcast message and the second uplink parameter is transmission via a unicast message.

46. The apparatus of claim 41, further comprising means for configuring a virtual cell identified for the at least one UE, where the virtual cell identified is separately configured from a physical cell identifier associated with the second cell.

47. The apparatus of claim 41, wherein the first cell is distinct from the second cell.

48. The apparatus of claim 41, wherein the first cell is the same as the second cell.

49. The apparatus of claim 38, further comprising means for determining a second resource for receiving of the uplink control channel based on the first uplink parameter and a parameter associated with a downlink control channel for a second UE.

50. The apparatus of claim 49, wherein the determined second resource is orthogonal to the resource determined based on at least in part on the second uplink parameter.

51. A computer program product for wireless communications in a wireless network, comprising:
   a non-transitory computer-readable medium having program code recorded thereon, said program code comprising:
      program code to receive a first uplink parameter related to resource determination for transmission of an uplink control channel, wherein the first link parameter is a first starting index of the uplink control channel;
      program code to receive a second uplink parameter related to resource determination for transmission of the uplink control channel, wherein the second link parameter is a second starting index of the uplink control channel;
      program code to receive a data transmission from a first cell;
      program code to determine a resource for transmission of the uplink control channel based at least in part on the second uplink parameter; and
      program code to transmit the uplink control channel using the determined resource.

52. The computer program product of claim 51, wherein the program code to determine the resource is further based on the first uplink parameter.

53. The computer program product of claim 51, further comprising program code to receive a downlink control channel.

54. The computer program product of claim 53, wherein the downlink control channel is received from a second cell.

55. The computer program product of claim 53, wherein the resource determination is further based at least in part on a parameter associated with the downlink control channel.

56. The computer program product of claim 55, wherein the parameter is one of: a starting control channel element (CCE) index of a legacy control channel, and a starting enhanced CCE index of a new control channel.

57. The computer program product of claim 51, wherein the uplink control channel carries at least a H-ARQ response.

58. The computer program product of claim 51, wherein the first uplink parameter is received via a broadcast transmission and the second uplink parameter is received via a unicast transmission.

59. The computer program product of claim 54, wherein the determination of the resource is performed when the uplink control channel is based on a virtual cell identifier, separately configured from a physical cell identifier (PCI) associated with the second cell.

60. The computer program product of claim 54, wherein the first cell is distinct from the second cell.

61. The computer program product of claim 54, wherein the first cell is the same as the second cell.

62. The computer program product of claim 51, wherein the program code to receive the first uplink parameter includes program code to receive an uplink parameter related to resource determination for transmission of an uplink control channel to a first base station, and wherein the program code to receive the second uplink parameter includes program code to receive an uplink parameter related to resource determination for transmission of the uplink control channel to a second base station.

63. A computer program product for wireless communications in a wireless network, comprising:
   a non-transitory computer-readable medium having program code recorded thereon, said program code comprising:
      program code to transmit from a first cell a first uplink parameter related to resource determination for reception of an uplink control channel, wherein the first link parameter is a first starting index of the uplink control channel;
      program code to transmit from the first cell to at least one user equipment (UE) a second uplink parameter related to resource determination for reception of the uplink control channel, wherein the second link parameter is a second starting index of the uplink control channel;
      program code to perform a data transmission from the first cell;
      program code to determine a resource for receiving of the uplink control channel based at least in part on the second uplink parameter; and
      program code to receive the uplink control channel using the determined resource.

64. The computer program product of claim 63, wherein the program code to determine the resource is further based on the first uplink parameter.

65. The computer program product of claim 63, further comprising program code to transmit a downlink control channel.

66. The computer program product of claim 65, wherein the downlink control channel is transmitted from a second cell.

67. The computer program product of claim 65, wherein the resource determination is further based at least in part on a parameter associated with the downlink control channel.

68. The computer program product of claim 67, wherein the parameter is one of: a starting control channel element (CCE) index of a legacy control channel, a starting enhanced CCE index of a new control channel.

69. The computer program product of claim 63, wherein the uplink control channel carries at least a H-ARQ response.

70. The computer program product of claim 63, wherein the first uplink parameter is transmitted via a broadcast message and the second uplink parameter is transmission via a unicast message.

71. The computer program product of claim 66, further comprising program code to configure a virtual cell identified for the at least one UE, where the virtual cell identified is separately configured from a physical cell identifier associated with the second cell.

72. The computer program product of claim 66, wherein the first cell is distinct from the second cell.

73. The computer program product of claim 66, wherein the first cell is the same as the second cell.

74. The computer program product of claim 63, further comprising program code to determine a second resource for receiving of the uplink control channel based on the first uplink parameter and a parameter associated with a downlink control channel for a second UE.

75. The computer program product of claim 74, wherein the determined second resource is orthogonal to the resource determined based on at least in part on the second uplink parameter.

76. An apparatus configured for wireless communication, comprising:
  at least one processor; and
  a memory coupled to the at least one processor,
  wherein the at least one processor is configured:
    to receive a first uplink parameter related to resource determination for transmission of an uplink control channel, wherein the first link parameter is a first starting index of the uplink control channel;
    to receive a second uplink parameter related to resource determination for transmission of the uplink control channel, wherein the second link parameter is a second starting index of the uplink control channel;
    to receive a data transmission from a first cell;
    to determine a resource for transmission of the uplink control channel based at least in part on the second uplink parameter; and
    to transmit the uplink control channel using the determined resource.

77. The apparatus of claim 76, wherein the configuration of the at least one processor to determine the resource is further based on the first uplink parameter.

78. The apparatus of claim 76, wherein the at least one processor is further configured to receive a downlink control channel.

79. The apparatus of claim 78, wherein the downlink control channel is received from a second cell.

80. The apparatus of claim 78, wherein the resource determination is further based at least in part on a parameter associated with the downlink control channel.

81. The apparatus of claim 80, wherein the parameter is one of: a starting control channel element (CCE) index of a legacy control channel, and a starting enhanced CCE index of a new control channel.

82. The apparatus of claim 76, wherein the uplink control channel carries at least a H-ARQ response.

83. The apparatus of claim 76, wherein the first uplink parameter is received via a broadcast transmission and the second uplink parameter is received via a unicast transmission.

84. The apparatus of claim 79, wherein the determination of the resource is performed when the uplink control channel is based on a virtual cell identifier, separately configured from a physical cell identifier (PCI) associated with the second cell.

85. The apparatus of claim 79, wherein the first cell is distinct from the second cell.

86. The apparatus of claim 79, wherein the first cell is the same as the second cell.

87. The apparatus of claim 76, wherein the configuration of the at least one processor to receive the first uplink parameter includes configuration to receive an uplink parameter related to resource determination for transmission of an uplink control channel to a first base station, and wherein the configuration of the at least one processor to receive the second uplink parameter includes configuration to receive an uplink parameter related to resource determination for transmission of the uplink control channel to a second base station.

88. An apparatus configured for wireless communication, comprising:
  at least one processor; and
  a memory coupled to the at least one processor,
  wherein the at least one processor is configured:
    to transmit from a first cell a first uplink parameter related to resource determination for reception of an uplink control channel, wherein the first link parameter is a first starting index of the uplink control channel;
    to transmit from the first cell to at least one user equipment (UE) a second uplink parameter related to resource determination for reception of the uplink control channel, wherein the second link parameter is a second starting index of the uplink control channel;
    to perform a data transmission from the first cell;
    to determine a resource for receiving of the uplink control channel based at least in part on the second uplink parameter; and
    to receive the uplink control channel using the determined resource.

89. The apparatus of claim 88, wherein configuration of the at least one processor to determine the resource is further based on the first uplink parameter.

90. The apparatus of claim 88, wherein the at least one processor is further configured to transmit a downlink control channel.

91. The apparatus of claim 90, wherein the downlink control channel is transmitted from a second cell.

92. The apparatus of claim 90, wherein the resource determination is further based at least in part on a parameter associated with the downlink control channel.

93. The apparatus of claim 92, wherein the parameter is one of: a starting control channel element (CCE) index of a legacy control channel, and a starting enhanced CCE index of a new control channel.

94. The apparatus of claim 91, wherein the uplink control channel carries at least a H-ARQ response.

95. The apparatus of claim 91, wherein the first uplink parameter is transmitted via a broadcast message and the second uplink parameter is transmission via a unicast message.

96. The apparatus of claim 91, wherein the at least one processor is further configured to configure a virtual cell identified for the at least one UE, where the virtual cell identified is separately configured from a physical cell identifier associated with the second cell.

97. The apparatus of claim 91, wherein the first cell is distinct from the second cell.

98. The apparatus of claim 91, wherein the first cell is the same as the second cell.

99. The apparatus of claim 88, wherein the at least one processor is further configured to determine a second resource for receiving of the uplink control channel based on the first uplink parameter and a parameter associated with a downlink control channel for a second UE.

100. The apparatus of claim 99, wherein the determined second resource is orthogonal to the resource determined based on at least in part on the second uplink parameter.

* * * * *